Patented May 12, 1925.

1,537,235

UNITED STATES PATENT OFFICE.

AMASA P. HAY, OF GOSHEN, INDIANA.

POWER-TRANSMISSION MECHANISM.

Application filed October 1, 1923. Serial No. 665,877.

*To all whom it may concern:*

Be it known that I, AMASA P. HAY, a citizen of the United States, residing at Goshen, in the county of Elkhart and State of Indiana, have invented certain new and useful Improvements in Power-Transmission Mechanism, of which the following is a specification.

This invention relates to power transmission for wheeled vehicles, particularly trucks, tractors, and the like, and has for its object the provision of a novel drive mechanism which will have the maximum efficiency in the application of power to the driving or ground engaging wheels of the vehicle.

An important and more specific object is the provision of a transmission in which the motive power is applied to the traction wheels at a point near the periphery instead of upon the axle as is the general practice, the advantage being that a much greater leverage is obtained whereby the drive will be easier and more efficient.

A further object is the provision of a drive mechanism which includes intermeshing gears for positively rotating both of the ground engaging or traction wheels of the vehicle, or more than two if desired, the wheels being roller supported whereby strain on the gears will be relieved so that jamming or binding of the teeth will be prevented at all times.

Yet another object is the provision of a transmission of this character in which the wheel carrying axle is mounted in bearings capable of sliding movement with respect to the supporting frame, the slidability of the bearings, the supporting action of the rollers, and the location of the driving point at a remote distance from the center of the wheels all cooperating to give the desired result.

An additional object is the provision of a structure of this character which will be simple and inexpensive in manufacture and installation, economical in the utilization of power for driving purposes, efficient and durable in service, and a general improvement in the art.

With the above and other objects and advantages in view, the invention consists in the combination and arrangement of the several parts to be hereinafter more fully described and claimed and illustrated in the accompanying drawings in which:

Figure 1 is a diagrammatic side elevation illustrating the principles involved.

Figure 1ᵃ is a slight modification thereof.

Figure 1:
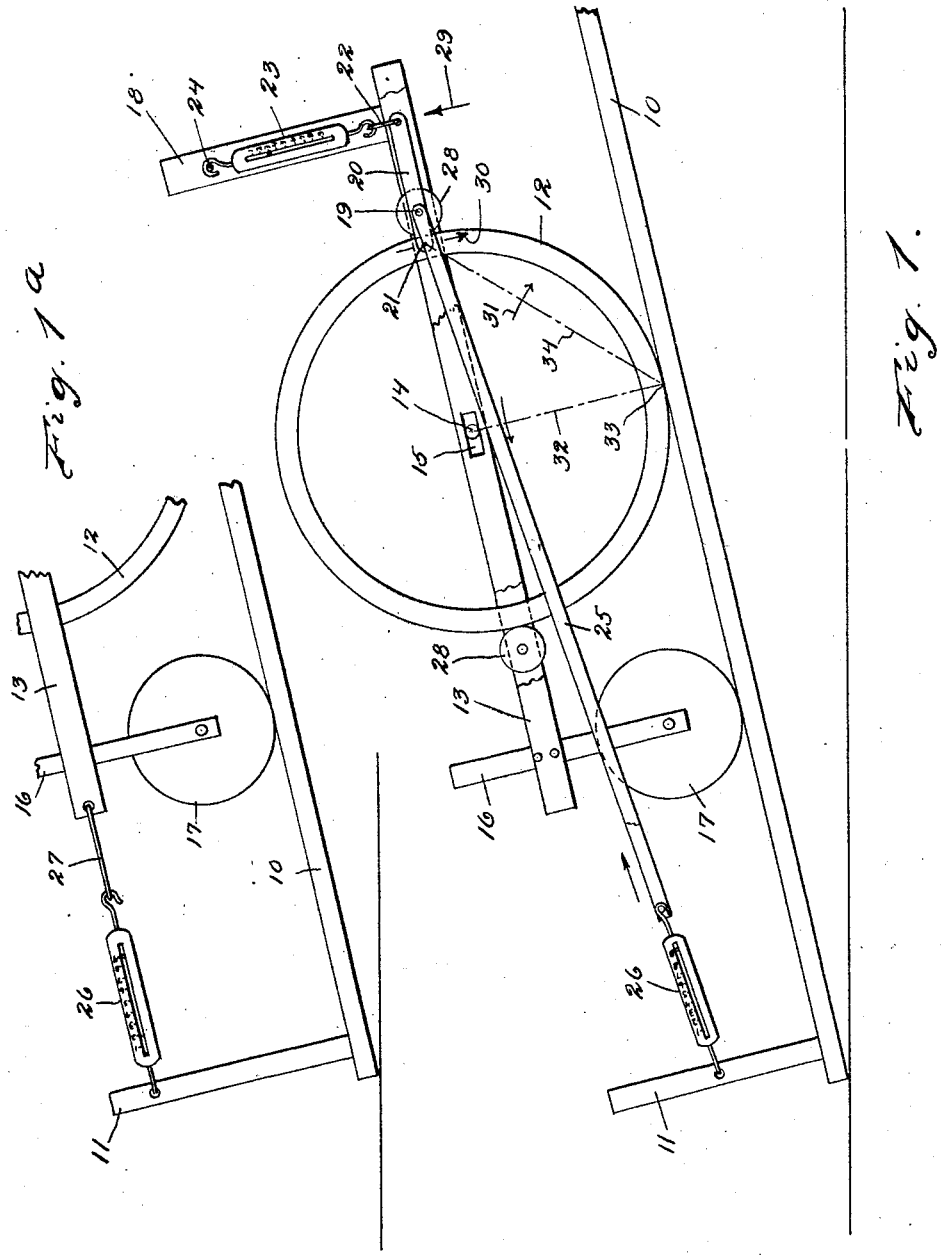
Figure 2:
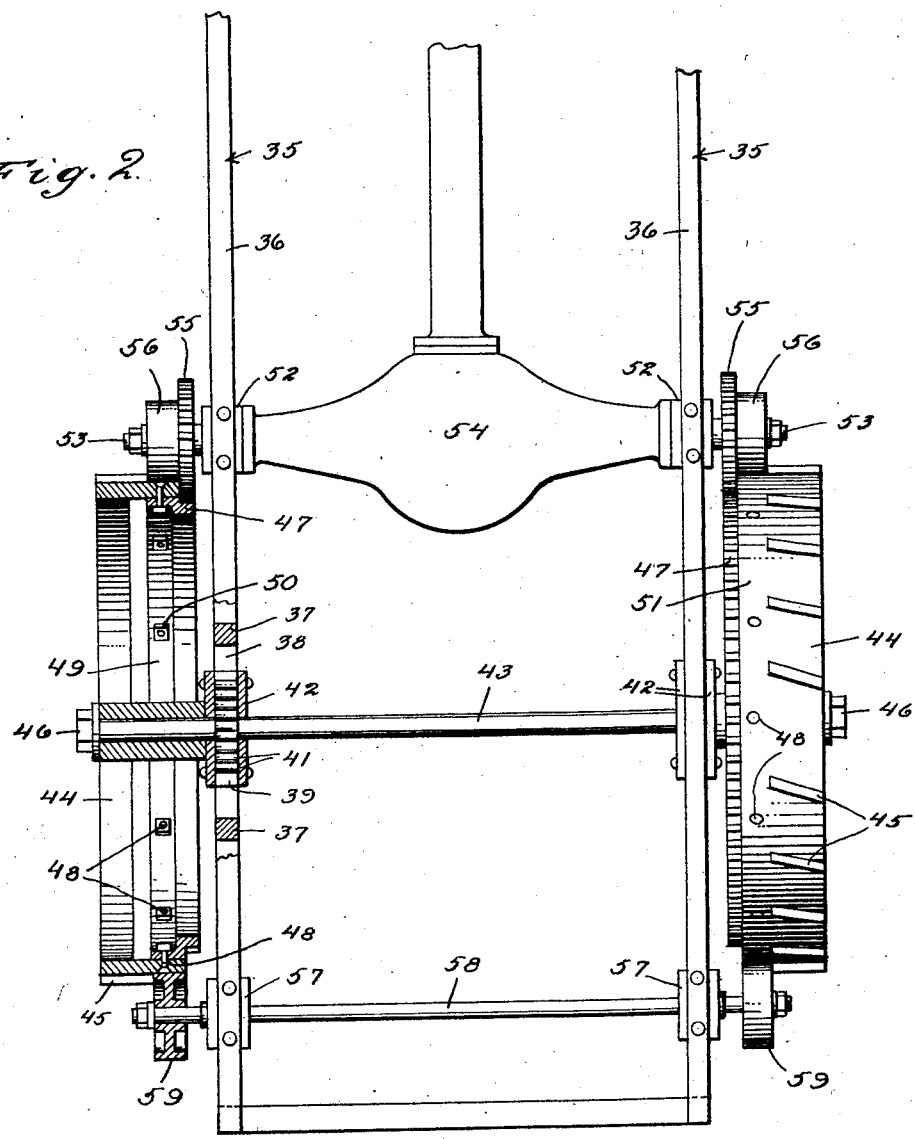
Figure 2 is a plan view, partly in section, showing my drive mechanism applied to a truck.
Figure 3:
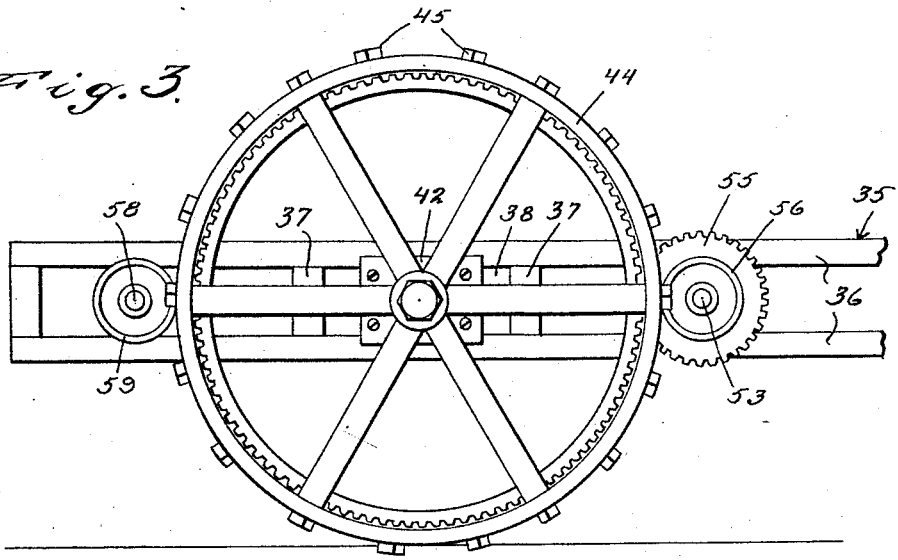
Figure 3 is a side elevation.
Figure 4:
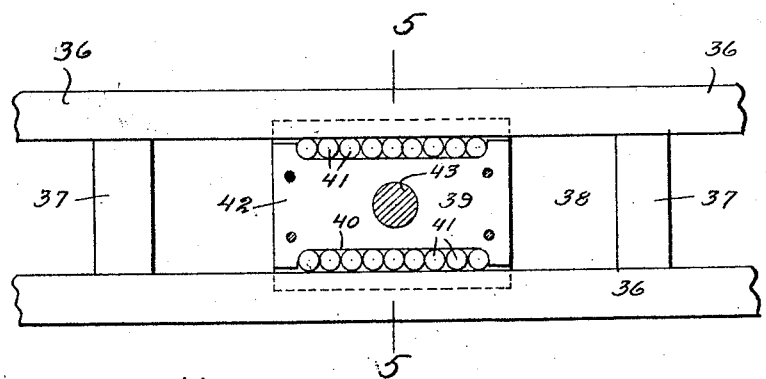
Figure 4 is a detail side elevation of the frame showing the slidable bearing, one side plate thereof being removed.
Figure 5:
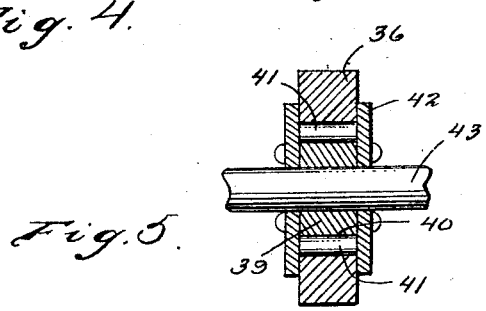
Figure 5 is a cross section on the line 5—5 of Figure 4.

Referring more particularly to the drawings, I have shown in Figures 1 and 1ᵃ a diagrammatic representation of the apparatus illustrating the principle involved. The apparatus disclosed in these two figures is of course any such as would be applied to a truck, tractor, or in fact, any other vehicle in actual practice, parts being merely so combined and arranged as to show the operation and underlying spirit.

In these two figures the numeral 10 indicates an incline at one end of which is a stationary support or post 11. Disposed upon the inclination is a wheel 12 which represents the traction wheel of a vehicle, which wheel is mounted within a frame 13 and is journaled upon an axle 14 capable of having slidable movement within slots 15 in the sides of the frame. At the rear or lower end of the frame is a standard 16 which carries a trailer wheel 17 likewise disposed on the incline. At the forward end of the frame is an upright 18 for a purpose to be described. Pivoted transversely of the frame in advance of the wheel 12, as shown at 19, is a lever 20 which has one end provided with a point or prong 21 engaging in one side of the wheel 12 so as to be incapable of slipping with respect thereto. Connected with the other arm of this lever by a link 22 is a spring scale 23 which is supported from the member 18, as shown at 24. In the present instance the ratio of the two arms of the lever 20 is substantially three to one though it should be understood that any other proportion may be used if preferred.

In Figure 1 I have shown a draft rod or bar 25 to be duplicated at both sides of the apparatus, though only one is shown. The forward end of this draft bar is connected at the pivot 19 while connected with the rear end is a spring scale 26 carried by the support 11. In Figure 1ᵃ the scale is connected directly with the rear end of the frame by a link 27, this being the only difference between the two figures.

The lever 20 is supposed to represent gearing as will be seen when referring to the other figures which show an actual transmission constructed in accordance with this invention. Mounted on the frame 13 are rotatable rollers 28 which bear against the periphery of the wheel 12 for holding the same centered and relieving strain on the actuating lever.

In this arrangement it is to be observed that there is an upward pressure of say three pounds applied to the forward or long arm of the lever 20, the three pounds being indicated by the pointer on the scale 23. This upward pressure on the long arm of the lever 20 causes downward pressure to be applied to the wheel 12 where the prong or point 21 engages the wheel. These two pressures are indicated by the arrows 29 and 30, respectively. When this pressure is applied the pointer on the scale 26 registers nine pounds which proves conclusively that the power applied to the wheel 12 is increased three times. A very important feature is the slidability of the axle of the wheel 12 with respect to the frame 13 and the engagement of the rollers against the wheel, these features cooperating to relieve all strain on the lever 20 so that the entire power applied thereto will be exerted to impart rotation to the wheel instead of a portion being lost on account of binding. The great advantage of applying the power to the peripheral portion of the wheel lies in the fact that when the wheel is traveling up an incline there is a species of toggle action which tends to rock the weight forwardly, as indicated by the arrow 31 in contradistinction to the ordinary action which occurs when power is applied to the axle. In this latter instance the line 32 between the center of the axle and the traction point 33 is inclined rearwardly whereas with the use of my drive the line 34 drawn from the traction point to the point of intermeshing of gears or, as shown in this diagram, the point of engagement of the prong 21 with the wheel is inclined forwardly. From this arrangement it is thus apparent that the load instead of having a tendency to dip back has the reverse tendency and leans forward when the power is applied.

In Figures 2 to 5, inclusive, I have illustrated the application of this principle in the construction of a transmission for a truck. In these figures the numeral 35 indicates a frame which might be of any ordinary or preferred construction but which is here represented as including upper and lower side bars 36 spaced apart by struts 37 which define slots or openings 38. Slidably mounted within these slots or openings are bearing blocks 39 formed with races 40 within which are engaged rollers 41 which bear against the confronting faces of the bars 36. These rollers are maintained in association with the block and the block is prevented from lateral displacement by side plates 42 secured thereto and overlapping the bars 36. Passing through the bearing blocks 39 is an axle 43 on which are journaled ground engaging wheels 44 here shown as equipped with traction lugs 45 and retained in place on the axle by nuts 46 or the like. In case the device should be intended to travel on rails it is quite obvious that the wheels would necessarily be modified so as to be of the flanged type, though illustration of such a variation is unnecessary.

Secured upon the inner periphery of each wheel 44 is a large ring gear 47 which might be secured thereto in any one of a wide variety of ways though in the present instance I have shown bolts 48 which have their heads countersunk into the wheel to be flush with the periphery thereof, these bolts passing through a flange 49 projecting inwardly from the gear and being equipped with binding nuts 50. It should be stated that the cleats or lugs 45 do not extend entirely across the face of the wheel in order to leave a smooth portion 51.

Secured upon the side of the frame in advance of the wheel are suitable bearings 52 through which are journaled spindles 53 which project from a differential gear drive mechanism, not shown, enclosed within a housing 54. The type of gearing and drive may be the same as provided on any ordinary truck and the engine for effecting the drive is not shown in the present case any more than is the gearing inasmuch as such is unnecessary to a proper understanding of the invention. Secured upon the projecting ends of these spindles are pinions 55 which mesh with the ring gears 47, and rotatably mounted on these spindles are rollers 56 which bear against the smooth portions 51 of the wheels.

At the rear portion of the frame I provide other bearings 57 through which is journaled a shaft 58 carrying rollers 59 which likewise bear upon the smooth portions of the wheels at points diametrically opposite the points of engagement of the rollers 56 therewith. These rollers 56 and 59 operate to hold the wheels 44 properly while relieving all strain on the pinions 55 and gears 47 so that binding at the points of intermeshing will be absolutely prevented. Likewise there can be no binding at the axle 43 owing to the fact that the bearings 39 are capable of sliding movement between the upper and lower bars of the frame. In actual practice it is probable that there would be no real sliding but the possibility is present for the purpose of preventing the binding and relieving strains which would greatly increase the friction on the operating parts.

When the spindles 53 are driven by the truck or tractor motor, it is apparent that the gears 55 will operate to drive the wheels 44. It is observed that the power is applied to the wheels near the periphery thereof so that the greatest possible leverage will be obtained. Naturally the gears 47 should be inset somewhat with respect to the peripheries of the wheels so as to avoid contact of the gears with rocks, clods, or the sides of ruts, as such contact might cause serious injury thereto. Owing to the fact that the differential mechanism is provided in the housing 54, it is unnecessary to provide any means in association with the wheels themselves for permitting one to travel faster than the other as for instance when rounding corners, backing or the like.

From the foregoing description and a study of the drawings it will be apparent that I have thus provided a simply constructed and easily installed transmission mechanism which is capable of general utility but which is particularly well adapted for use in connection with trucks or tractors, or in fact other vehicles where maximum power is the main consideration. Ample provision has been made for taking care of all contingencies which might readily be foreseen so that the entire mechanism will have the utmost durability.

While I have shown and described the preferred embodiment of my invention, it is to be understood that I reserve the right to make many changes in the form, construction and arrangement of parts provided the changes do not depart from the spirit of the claims, a contemplated possibility being the provision of drive mechanism at the rear of the wheels as well as at the front thereof for facilitating the reversal of the drive.

I claim:

1. In a transmission mechanism, a frame, bearings slidable longitudinally of the frame, an axle journaled through said bearings, ground engaging wheels on the axles, ring gears on the wheels, a shaft mounted transversely of the frame, rollers on said shaft bearing against the rearmost points of the wheels, drive spindles, rollers on said spindles bearing against the forwardmost portions of the wheels, and pinions on said spindles meshing with the forwardmost points of the gears.

2. In a traction mechanism, a frame, bearings mounted for slidable movement within said frame, an axle passing through said bearings and having traction wheels journaled thereon, a ring gear carried by each traction wheel, driven pinions meshing with the respective gears, and rollers bearing upon the periphery of the wheels for holding them centered and relieving strain upon the gears, the pinions engaging the forwardmost points of the gears.

3. In a transmission mechanism, a frame, roller bearings slidably mounted in the frame and carrying an axle, traction wheels journaled upon the axle outwardly of the frame and having portions of their peripheries smooth and the remaining portions provided with traction lugs, gears on the wheels, rollers journaled on the frame and riding upon the smooth portions of the wheels for holding the same centered, and pinions on the shafts of certain of the rollers meshing with said gears.

4. In a power transmission mechanism, a frame, a differential drive mechanism carried by the frame and including driven spindles carrying pinions, an axle mounted for slidable movement longitudinally of the frame and carrying traction wheels rotatable thereon, and gears carried by said traction wheels and meshing with said pinions, said pinions further carrying rollers rotatable thereon, a shaft journaled across the rear portion of the frame, and other rollers on said shaft bearing against said traction wheels at points diametrically opposite the points of engagement therewith by the first named rollers.

In testimony whereof I hereto affix my signature.

AMASA P. HAY.